US008381915B2

(12) United States Patent
Tavakkoli et al.

(10) Patent No.: US 8,381,915 B2
(45) Date of Patent: Feb. 26, 2013

(54) PROCESS OF PURIFICATION OF MINERALS BASED ON CALCIUM CARBONATE BY FLOTATION IN THE PRESENCE OF QUATERNARY IMIDAZOLIUM METHOSULFATE

(75) Inventors: Bahman Tavakkoli, Puch (AT); Thomas Mangelberger, Villach (AT); Jörg Maier, Gödersdorf (AT); Matthias Buri, Rothrist (CH)

(73) Assignee: Omya Development AG, Oftringen (CH)

( * ) Notice: Subject to any disclaimer, the term of this patent is extended or adjusted under 35 U.S.C. 154(b) by 813 days.

(21) Appl. No.: 12/448,700

(22) PCT Filed: Jan. 11, 2008

(86) PCT No.: PCT/IB2008/000062
§ 371 (c)(1),
(2), (4) Date: Sep. 1, 2009

(87) PCT Pub. No.: WO2008/084391
PCT Pub. Date: Jul. 17, 2008

(65) Prior Publication Data
US 2010/0040528 A1    Feb. 18, 2010

(30) Foreign Application Priority Data
Jan. 12, 2007 (EP) .................... 07000640

(51) Int. Cl.
*B03D 1/01* (2006.01)
*B03D 1/012* (2006.01)
*B03D 1/02* (2006.01)

(52) U.S. Cl. ....................................... 209/166
(58) Field of Classification Search ............... 209/166
See application file for complete search history.

(56) References Cited

U.S. PATENT DOCUMENTS

| 3,990,966 | A | 11/1976 | Stanley et al. |
| 4,293,097 | A | 10/1981 | Lewis et al. |
| 4,424,122 | A | 1/1984 | Parlman et al. |
| 4,892,649 | A | 1/1990 | Mehaffey et al. |
| 4,995,965 | A | 2/1991 | Mehaffey et al. |
| 2009/0206010 | A1* | 8/2009 | Klingberg et al. ............ 209/162 |

FOREIGN PATENT DOCUMENTS

| CA | 1 187 212 A1 | 5/1985 |
| EP | 0216002 A2 | 4/1987 |
| EP | 0591633 A1 | 4/1994 |
| GB | 1535143 | 12/1978 |
| SU | 1220695 A1 | 3/1986 |
| WO | 9726995 | 7/1997 |
| WO | WO2007/122148 A1 * | 11/2007 |

OTHER PUBLICATIONS

The International Search Report for PCT Application No. PCT/IB2008/000062, Jun. 3, 2008.
The Written Opinion of the International Searching Authority for PCT Application No. PCT/IB2008/000062. Jun. 3, 2008.

* cited by examiner

*Primary Examiner* — Thomas M Lithgow
(74) *Attorney, Agent, or Firm* — Amster, Rothstein & Ebenstein LLP

(57) ABSTRACT

The invention concerns a process for purification of calcium carbonate-comprising minerals comprising at least one flotation step, characterized in that this step implements at least one quaternary imidazoline methosulfate compound as collector agent.

37 Claims, No Drawings

PROCESS OF PURIFICATION OF MINERALS BASED ON CALCIUM CARBONATE BY FLOTATION IN THE PRESENCE OF QUATERNARY IMIDAZOLIUM METHOSULFATE

This is a U.S. national phase of PCT Application No. PCT/IB2008/000062, filed Jan. 11, 2008, which claims the benefit of European Application No. 07000640.8, filed Jan. 12, 2007.

The object of the present invention is a process for purification of calcium carbonate comprising minerals comprising at least one flotation step, characterised in that this step implements at least one quaternary imidazoline methosulfate compound as collector agent.

Calcium carbonate-based pigments and/or fillers are used in numerous applications, including paint, paper and plastic applications. The impurities that may be present in the pigments and/or fillers are notably silicate-, sulphide- or graphite-based. Beyond the fact that they may deleteriously affect the final properties of these calcium carbonate-based pigments and/or fillers (such as their whiteness), these impurities are also detrimental due to their abrasive nature which causes wear of and damage to the equipment used for further treatment of these pigments and fillers (such as, notably, grinding mills, wire of paper machines and coating blades).

It is therefore important to eliminate such impurities. To this end, flotation processes are employed, which consist of separating the minerals to be treated from their impurities in a selective manner in direct and/or indirect flotation process. Flotation calls upon physical and chemical phenomena. The principle of this process is to render the particles to be separated hydrophobic (non-wetable by water) using specific reagents referred to as collectors, in a tank within which an agitation of the suspension of the material to be treated takes place. With the creation of the gas bubbles, for example by injection of air, the particles (rendered) hydrophobic are collected by the gas phase. As a result, and if the bubble dimensions allow it, the collected particles are upheld within the suspension and concentrated in a supernatant foam at the surface. The foam can subsequently be collected by either skimming it off the surface or simply via the overflow.

It is important to review, in chronological order, the different solutions that have been proposed to the skilled man in terms of the chemical nature of the collector agents that can be implemented in a process of flotation to remove impurities from calcium carbonate-containing minerals.

Historically, a first approach of the state of the art is contained in documents proposing imidazoline derivative-type solutions.

As such, the skilled man knows GB 1 535 143, which describes thione-type compounds, such as, notably, N,N'-bis-(decahydroquinolyl-N-methyl)-imidazolidine-2-thione, which can be employed as a herbicide, but also as flotation agents for non-ferrous metals, although this latter application is not illustrated in the document.

He is also aware of SU 1 220 695, which describes the selective flotation of potassium-based impurities in clay suspensions, while minimising the degree of insole residues. The solution described in this document consists of using a mixture of dialkyl polyethylene glycol esters of phosphoric acid and N,N-bis-(2-hydroxyethyl)-2-alkylimidazolinium chloride.

He is additionally aware of EP 0 216 002, which describes a process of flotation of calcite-based minerals used in the paper industry. This process is based on a flotation step, followed by an upconcentration and several grinding steps, and finally by a classification. Prior to the flotation step, the aqueous calcite suspension is conditioned by introducing a mixture of non-polar hydrocarbon oils and an imidazoline acetate salt. In this way, the quantity of insole impurities based on tremolite, feldspar and quartz is initially reduced.

He also knows U.S. Pat. No. 4,293,097, which describes a process to manufacture calcium carbonate of improved the whiteness. This process involves a first grinding step, followed by a flotation step, an upconcentration and finally another grinding step. The flotation is performed using 1-substituted-2-alkyl imidozoline as collector in combination with non-polar aliphatic compounds featuring 10 to 20 atoms along the longest carbon chain length as flotation promoter. The discolouring impurities, based principally on micas and pyrites, are thereby reduced.

However, the above documents present one major disadvantage for the skilled man: the collectors employed are in the form of a powder which makes them difficult to handle. U.S. Pat. No. 3,990,966 proposes another solution to the skilled man in order to overcome this disadvantage of the prior art. This solution consists in a process to purify calcite-based minerals which involves a step of flotation of pyrite-based impurities using a cationic surfactant selected from 1-hydroxyethyl-2-heptadecenyl glyoxalidine and 1-hydroxyethyl-2-alkylimidazoline and its salts, when the alkyl group of the imidazoline is a fatty acid.

Nevertheless, the latter document cannot satisfy the skilled man since it raises an important disadvantage which is clearly underlined in later CA 1 187 212 (see notably page 1, lines 26 to 31): the collectors employed in U.S. Pat. No. 3,990,966 are not sufficiently selective relative to the impurities (and notably silicates). CA 1 187 212 therefore proposes another solution, which consists of a process of purification of calcium carbonate-based mineral by flotation of the silicates, when the distinguishing characteristic is the use of a cationic collector selected from the following quaternary amines:

a) dimethyl dialkyl with 8 to 16 carbon atoms in the alkyl radicals, said alkyl radicals being saturated or unsaturated, branched or normal aliphatics,
b) dimethyl alkyl benzyl with 10 to 22 carbon atoms in the alkyl radical, which is a normal aliphatic,
c) bis-imidazoline with 12 to 18 carbon atoms in the alkyl radicals, which are normal saturated or unsaturated aliphatics,
d) salts of quaternary amines a), b) and c).

The imidazoline-based collector is bis-imidazolinium methyl sulfate.

At this point, it is important to underline two points:
there exists therefore a need to provide the skilled man with collectors which are easy to handle and present a good selectivity relative to silicates; this constitutes a first technical problem solved by CA 1 187 212;
all of the solutions proposed by the state of the art clearly advocate the use one of the products based on imidazoline derivatives.

However, CA 1 187 212 was identified with a major disadvantage for the skilled man: a poor yield of the collectors implemented, said yield being defined as the weight percentage of calcium carbonate present in the treated product relative to the initial calcium carbonate weight (this disadvantage was also present in U.S. Pat. No. 3,990,966).

This remark was clearly recorded in two later documents, which constitute a second approach in the prior art, which contrast to the first documents citing imidazoline derivatives:
EP 0591 633, which proposes more efficient collectors in terms of yield relative to those of U.S. Pat. No. 3,990,966 on page 2 lines 24 to 35;

and U.S. Pat. No. 4,892,649, which indicates more efficient collectors in terms of yield than the imidazolines of the prior art described in U.S. Pat. No. 3,990,966 and CA 1 187 212 in column 1;

WO 97/26 995, which discloses very efficient collectors in terms of selectivity versus silicates.

To this end, EP 0 591 633 proposes collectors based on alkoxylated alkyl guanidines with 8 to 24 carbon atoms and 1 to 10 alkoxylated groups, or based on alkoxylated fatty alkyl amines featuring 8 to 24 carbon atoms and 1 to 6 alkoxy groups.

U.S. Pat. No. 4,892,649 proposes collectors based on dimethyl(2-ethylhexyl) cocoammonium chloride.

WO 97/26 995, which discloses a flotation process using as collector compounds which are quaternized esterified products of mono-, di-, or trialkanolamines with carboxylic acid. They are used, possibly in combination with other anionic, cationic, amphoteric and/or non-ionic substances. The flotation aids have good biodegradability and high selectivity (especially for flotation of silicates).

These 3 documents therefore propose solutions to solve the technical problem to provide the skilled man, in a calcium carbonate-based mineral product flotation process, with collectors that:
feature a good selectivity relative to silicate-type impurities,
and lead to a high yield (U.S. Pat. No. 4,892,649 fixes this high yield to at least 90% by weight relative to the initial calcium carbonate weight).

The Applicant underlines that, by contrast to the earlier state of the art, these three documents no longer advocate the use of imidazoline compounds.

Yet, continuing his search to solve the technical problem described previously, the Applicant has surprisingly found a new process to purify calcium-carbonate comprising minerals comprising a flotation step, characterised in that this step implements at least one quaternary imidazoline methosulfate compound as collector agent. Not only is the technical problem so resolved, but the calcium carbonate yield is measurably improved since it is superior to 90%, preferably superior to 95% and more preferably superior to 98% by weight relative to the initial calcium carbonate weight.

The merit of the Applicant rests notably on the fact that, contrary to the state of the art which incited the skilled man to no longer make use of imidazoline derivatives, the Applicant remarked that particular imidazoline compounds allowed the abovementioned technical problem to be resolved, while measurably improving the yield of the purification process.

The Applicant not only acted against a prejudice that incited the skilled man to no longer use imidazoline derivatives, but further identified a class of quite particular imidazoline derives that allow the abovementioned results to be obtained. This class is that of the quaternary imidazoline methosulfates which, though known as softening agents in washing powders, were previously never employed as collectors in a calcium carbonate purification process.

In particular, the Applicant demonstrates entirely surprising results obtained with 1-methyl-2-noroleyl-3-oleic acid-amidoethylimidazolium-methylsulfate, with a goal to resolve the abovementioned technical problem with a yield superior to 90%, preferably superior to 95% and more preferably superior to 98% by weight relative to the initial calcium carbonate weight.

Moreover, the association of this compound with at least one other imidazoline derivative and/or at least one primary, secondary, quaternary amine or its salts leads not only to the solution of the previously mentioned technical problem, but also leads to a yield superior to 90%, preferably superior to 95% and more preferably superior to 98% by weight relative to the initial calcium carbonate weight, and further to obtain a purified product featuring a lower degree of impurities (less than 1%, preferably less than 0.5%, more preferably less than 0.2% by dry weight impurities relative to the total weight of the purified suspension). Furthermore, via such an association, the percentage of insole eliminated from the suspension containing a calcium carbonate-based mineral can be notably decreased, which represents another advantage brought by the technical solution of the present invention.

Without wishing to be bound to any theory, it is the opinion of the Applicant that, in the present invention, the association previously described allows the formation of a foam having a consistency such that it provides for an efficient separation of the hydrophilic calcium carbonate particles and the hydrophobic insole particles.

As such, in order to obtain an aqueous suspension containing calcium carbonate, featuring a high yield in terms of purified calcium carbonate weight (superior to 90%, preferably 95%, more preferably 98% by weight relative to the initial calcium carbonate weight), using products that are easy to handle, and featuring a good selectivity relative to silicates, the Applicant has developed a purification process comprising at least one flotation step of a calcium carbonate-comprising mineral, characterised in that this step implements at least one collector agent that is a quaternary imidazolium methosulfate.

As such, a first object of the invention is a process of purification of a calcium carbonate-comprising mineral comprising at least one flotation step, characterised in that this step implements as collector agent at least one compound that is a quaternary imidazolium methosulfate.

This process is also characterised in that the said quaternary imidazolium methosulfate has a side chain which is saturated or not, the said side chain containing from 8 to 22, preferably from 12 to 20, very preferably from 16 to 18 carbon atoms.

This process is also characterised in that said quaternary imidazolium methosulfate is 1-methyl-2-noroleyl-3-oleic acid-amidoethylimidazolium-methylsulfate.

The process according to the invention is characterised in that said quaternary imidazolium methosulfate is implemented with at least one primary, secondary, tertiary, quaternary amine and/or at least one of their salts.

The process according to the invention is also characterised in that the said primary, secondary, tertiary, quaternary amine and/or their salts are selected:
a) such that at least one of said amines and/or one of their salts features:
three nitrogen substituents that are a hydrogen atom or a linear or branched hydrocarbon chain featuring 1 to 22 carbon atoms,
such that no more than two of said three nitrogen substituents are a hydrogen,
and in the case where said amine is a quaternary amine, the fourth nitrogen substituent is a methyl or benzyl group;
b) and/or such that at least one of said amine is a bis-imidazoline and/or its salts:
such that it features preferably 8 to 22 carbon atoms in the alkyl radicals which are normal saturated or unsaturated aliphatics,
and such that it is very preferably 1-(2-hydroxyethyl)-2-(tall oil alkyl)-2-imidazoline.

The process according to the invention is also characterised in that the said quaternary amine and/or its salts are selected among from:
- a dimethyl dialkyl amine and/or methyl trialkyl amine and/or their salts, featuring preferably featuring from 8 to 22 carbon atoms in the alkyl radicals, said alkyl radicals being saturated or unsaturated, linear or branched aliphatic group,
- a dimethyl alkyl benzyl amine and/or methyl dialkyl benzyl amine and/or their salts, preferably featuring 8 to 22 carbon atoms in the radical alkyl which is a linear or branched aliphatic group.

The process according to the invention is also characterised in that the said quaternary amine is neutralised with a sulphate and/or chloride.

The process according to the invention is also characterised in that the said salts of primary, secondary and tertiary amine are partially or fully neutralised with an acetate.

Embodiment when Bis-Imidazoline and/or its Salt is Implemented

According to the embodiment when bis-imidazoline and/or its salt is implemented with the quaternary imidazolium methosulfate, the process according to the invention is characterised in that the weight ratio (quaternary imidazolium methosulfate):(bis-imidazoline and/or its salt) is between 10:90 and 99:1, preferably between 25:75 and 75:25, and more preferably between 35:65 and 40:60.

According to this embodiment, the process according to the invention is also characterised in that an alkyldiamine salt is additionally implemented.

According to this embodiment, the process according to the invention is also characterized in that said alkyldiamine salt is an alkyldiamine acetate salt, when the two amine groups are preferably entirely neutralised with acetic acid, and when the alkyl group is preferably a group featuring from 8 to 22 carbon atoms that are entirely or partially hydrated, said alkyl group is even more preferably constituted of at least 70 mole % of a group featuring from 12 to 18 carbon atoms, the most preferred alkyldiamine salt being N-Tallow-alkylt-rimethylenediamineacetate.

According to this embodiment, the process according to the invention is also characterised in that the weight ratio of (bis-imidazoline):(alkyldiamine salts) is between 85:15 and 95:5, and preferably is 90:10.

Embodiment when a Quaternary Amine and/or its Salts Selected Among from a Dimethyl Dialkyl Amine and/or a Methyl Trialkyl Amine and/or a Dimethyl Alkyl Benzyl Amine and/or a Methyl Dialkyl Benzyl Amine and/or their Salts is Implemented According to another embodiment when a quaternary amine and/or its salts selected among from a dimethyl dialkyl amine and/or a methyl trialkyl amine and/or a dimethyl alkyl benzyl amine and/or a methyl dialkyl benzyl amine and/or their salts is implemented with the quaternary imidazolium methosulfate, the process according to the invention is also characterized in that the weight ratio (quaternary imidazolium methosulfate):(dimethyl dialkyl amine and/or methyl trialkyl amine and/or dimethyl alkyl benzyl amine and/or methyl dialkyl benzyl amine and/or their salts) is between 15:85 and 20:80, preferably between 25:75 and 30:70, more preferably between 35:65 and 40:60.

According to this embodiment, the process according to the invention is characterised in that a salt of dimethyl dialkyl amine and/or of a methyl trialkyl amine and/or of a dimethyl alkyl benzyl amine and/or of a methyl dialkyl benzyl amine is implemented, which is preferably a sulfate and/or a chloride, and more preferably a chloride.

According to this embodiment, the process according to the invention is also characterised in that said chloride is preferably dicocoalkyl-dimethyl ammonium chloride and/or trimethyltallow alkyl quaternary ammonium chloride and/or cocoalkyl-trimethyl ammonium chloride.

According to this embodiment, the process according to the invention is also characterised in that 2-propanol and water are additionally implemented.

According to this embodiment, the process according to the invention is also characterised in that the weight ratio of the (dimethyl dialkyl amine and/or methyl trialkyl amine and/or dimethyl alkyl benzyl amine and/or methyl dialkyl benzyl amine and/or their salts):2-propanol:water is approximately equal to 75:15:10.

Other Characteristics

Generally, the process according to the invention is also characterised in that said quaternary imidazolium methosulfate is implemented with at least one graphite collector, which is preferably a carbinol, said carbinol being preferably a secondary pentyl alcohol, and/or pine oil and/or an ethoxylated amine, which preferably contains from 20 to 40 groups of ethylene oxide.

The process according to the invention is also characterised in that the flotation step is a direct or an inverse flotation, and preferably an inverse flotation.

The process according to the invention is also characterised in that the flotation step implements an agitation cell and/or a flotation column and/or a pneumatic flotation device and/or a flotation device featuring a gas injection and notably an air injection.

The process according to the invention is also characterised in that the flotation step implements from 100 to 1000 ppm collector, preferably from 200 to 800 ppm of collector, more preferably from 400 to 600 ppm collector, relative to dry solids in feed.

The process according to the invention is also characterised in that the flotation step is performed at a temperature between 4° C. and 80° C., and preferably between 20° C. and 50° C.

The process according to the invention is also characterised in that the flotation step is performed on an aqueous suspension of calcium carbonate-comprising mineral and features a solid content between 5% and 80%, and preferably between 25% and 70% of the total suspension weight.

The process according to the invention is also characterised in that the flotation step is performed on an aqueous suspension of calcium carbonate-comprising mineral which is a natural and/or synthetic calcium carbonate, preferably natural, said natural calcium carbonate being preferably selected from marble, chalk, limestone, calcite and mixtures thereof.

The process according to the invention is also characterised in that the flotation step is performed on an aqueous suspension of comprising a calcium carbonate-comprising mineral and at least one other mineral material selected from dolomites, bentonites, kaolin, talc, cement, gypsum, lime, magnesia, titanium dioxide, satin white, aluminium trioxide or even aluminium trihydroxide, silicas, micas and mixtures of these fillers among themselves or with calcium carbonate, such as talc-calcium carbonate mixtures, calcium carbonate-kaolin mixtures, or even calcium carbonate mixtures with aluminium trihydroxide or aluminium trioxide, or even mixtures with synthetic or natural fibres or even co-structures of minerals such as co-structures of talc-calcium carbonate or of talc-titanium dioxide, or mixtures thereof.

The process according to the invention is also characterised in that the flotation step allows the flotation of one or more impurities such as impurities of the silicate-type, preferably quartz, feldspar, micas, amphiboles, tremolites, chlorites and talc, and/or of the sulphide-type, preferably pyrites, pyrrhotites and markasites, and/or of the oxide-type, preferably magnetites, hematites and goethites.

The process according to the invention is also characterised in that the flotation step leads to an aqueous suspension comprising calcium carbonate, when at least 90%, preferably 95%, more preferably 98% by weight relative to the initial calcium carbonate weight is recovered.

The process according to the invention is also characterised in that the flotation step is followed and/or preceded by at least one step of dispersing and/or grinding, possibly in the presence of at least one dispersing agent and/or grinding aid agent.

The process according to the invention is also characterised in that the flotation step is followed by at least one classification step and/or at least one treatment step and/or at least one drying step.

The process according to the invention is also characterised in that the flotation step is performed during a time period of at least 10 minutes, preferably of at least 15 minutes, and more preferably of at least 20 minutes.

Preferably the skilled man in the art knows how to adjust the pH to an optimum of mineral selection using at least one acid and/or one base: it depends on the nature of the mineral and of the flotation agent used.

Notably, the process according to the invention is also characterised in that the flotation step is performed at a pH of from 6.5 to 10.5, and preferably of from 7 to 8.5.

The process according to the invention is at least characterised in that the flotation step is performed batchwise and/or in a continuous process.

EXAMPLES

Flotation Process Implemented in the Examples (1) The flotation process was performed in mechanical laboratory flotation machine Type. Outokumpu laboratory featuring a capacity of 4 liters, under an agitation of 1500 rpm and at a pulp temperature of 20° C.

(2) The solids content of the calcium carbonate slurry in the pulp added to the mechanical laboratory flotation machine was of 30% by weight, said calcium carbonate being pre-ground and featuring a median diameter of 32 μm as measured on a laser granularmeter commercialised under the name Cilas 920 by the company Quantrachrome. It contained 7.2% by weight of impurities as characterised by Hydrochloric acid insoluble residue (HCl-insoluble residues).

(3) A given amount of the flotation agent (Reagent 1 and Reagent 2) referred to hereunder was introduced and mixed with calcium carbonate slurry and conditioned in the flotation pulp for time period of 2 minute under a agitation of 1500 rpm.

(4) A flotation gas, consisting of air, was introduced via orifices situated along the axis of the agitator during a given time period indicated hereunder.

(5) The foam created was separated from the calcium carbonate slurry and both were the slurry and foam were dried in order to form two concentrates, and then weighed.

(6) A quantity of hydrochloric acid was then added to a weighed quantity of each of the concentrates in order to destroy the calcium carbonate. The weight of the remaining insoles was measured in order to determine the quantity of calcium carbonate and the quantity of insoles.

Examples 1 to 15

In examples 1 to 15, the following reagents were employed.

Reagent A

This liquid reagent consisted of:

100% by weight 1-methyl-2-noroleyl-3-oleic acid-amido-ethylimidazolium-methylsulfate Reagent B This liquid reagent consisted of:

90% by weight 1-(2-hydroxyethyl)-2-(tall oil alkyl)-2-imidazoline

10% by weight amine acetate

Reagent C

This liquid reagent consisted of:

75% by weight dicocoalkyl-dimethyl ammonium chloride

15% by weight 2-propanol

10% by weight water

The results in the table indicate that the collector according to the invention leads to a calcium carbonate yield superior to 90%, sometimes superior to 95% (for tests no 2 to 10, 13 to 15), and even sometimes superior to 98% (for tests no 4, 5, 8, 9, 10, 15).

The quantity of impurities in the flotation product was low, notably when using the combinations including reagents B and C. Excellent results are obtained with tests no 11 and 12, leading to a % of HCl insoles in the flotation product lower than 0.40%.

All the tested products exhibit a very good selectivity versus silicate.

The tested products are liquids which are very easy to handle.

At least, all the tested products are slightly corrosive.

| | | | | | | | Flotation | | | | Flotation Foam | | | |
|---|---|---|---|---|---|---|---|---|---|---|---|---|---|---|
| | | | | | | | Product | | | | | | | Calcite |
| Example | Reagent 1 | Quantity [%] | Reagent 2 | Quantity [%] | Flotation time [min.] | Reagent dosage ppm | Weight [g] | HCl-insoluble residue [%] | Mass yield [%] | Calcite yield [%] | Weight [g] | HCl-insoluble residue [%] | Mass yield [%] | yield (=loss of calcite) [%] |
| 1 | A | 0 | B | 100 | 15 | 500 | 1249.9 | 0.51 | 83.33 | 90.54 | 250.1 | 43.29 | 16.67 | 9.46 |
| 2 | A | 25 | B | 75 | 15 | 500 | 1345.8 | 1.23 | 89.72 | 95.31 | 154.2 | 54.34 | 10.28 | 4.69 |
| 3 | A | 50 | B | 50 | 15 | 500 | 1376.6 | 1.78 | 91.77 | 97.67 | 123.4 | 71.67 | 8.23 | 2.33 |
| 4 | A | 75 | B | 25 | 15 | 500 | 1390.0 | 2.50 | 92.67 | 98.02 | 110 | 70.5 | 7.33 | 1.98 |
| 5 | A | 100 | B | 0 | 15 | 500 | 1403.5 | 3.39 | 93.57 | 98.13 | 96.5 | 70.93 | 6.43 | 1.87 |

-continued

| Example | Reagent 1 | Quantity [%] | Reagent 2 | Quantity [%] | Flotation time [min.] | Reagent dosage ppm | Flotation Product Weight [g] | HCl-insoluble residue [%] | Mass yield [%] | Calcite yield [%] | Flotation Foam Weight [g] | HCl-insoluble residue [%] | Mass yield [%] | Calcite yield (=loss of calcite) [%] |
|---|---|---|---|---|---|---|---|---|---|---|---|---|---|---|
| 6 | A | 0 | C | 100 | 15 | 500 | 1336.1 | 0.80 | 89.07 | 96.28 | 163.9 | 65.92 | 10.93 | 3.72 |
| 7 | A | 25 | C | 75 | 15 | 500 | 1360.1 | 1.12 | 90.68 | 97.42 | 139.9 | 72.30 | 9.32 | 2.58 |
| 8 | A | 50 | C | 50 | 15 | 500 | 1373.6 | 1.48 | 91.58 | 98.30 | 126.4 | 79.77 | 8.42 | 1.70 |
| 9 | A | 75 | C | 25 | 15 | 500 | 1391.9 | 2.27 | 92.80 | 98.33 | 108.1 | 76.84 | 7.20 | 1.67 |
| 10 | A | 100 | C | 0 | 15 | 500 | 1403.5 | 3.39 | 93.57 | 98.13 | 96.5 | 70.93 | 6.43 | 1.87 |
| 11 | A | 0 | C | 100 | 20 | 700 | 1305.3 | 0.28 | 87.02 | 93.49 | 194.7 | 49.88 | 12.98 | 6.51 |
| 12 | A | 25 | C | 75 | 20 | 700 | 1322.2 | 0.34 | 88.15 | 94.72 | 177.8 | 55.42 | 11.85 | 5.28 |
| 13 | A | 50 | C | 50 | 20 | 700 | 1350.7 | 0.60 | 90.05 | 96.59 | 149.3 | 65.78 | 9.95 | 3.41 |
| 14 | A | 75 | C | 25 | 20 | 700 | 1366.6 | 1.02 | 91.11 | 97.31 | 133.4 | 69.78 | 8.89 | 2.69 |
| 15 | A | 100 | C | 0 | 20 | 700 | 1379.0 | 1.22 | 91.93 | 98.07 | 121.0 | 76.03 | 8.07 | 1.93 |

Examples 16 to 17

In these examples, the following reagents were employed.
Reagent A
This liquid reagent consisted of:
100% by weight 1-methyl-2-noroleyl-3-oleic acid-amido-ethylimidazolium-methylsulfate
Reagent C
This liquid reagent consisted of:
75% by weight dicocoalkyl-dimethyl ammonium chloride
15% by weight 2-propanol
10% by weight water
Reagent D
This liquid reagent sold under the trade name OMC 5044 G by the company Cognis essentially consisted of a mixture of approximately the following:
>20% by weight methylalkylamidoethylalky-limidozonlinemethylsulfate
15-30% by weight of a mixture of methylalkylammonium chlorides
>20% by weight 2-propanol
>30% by weight water The results in the table indicate that the collector according to the invention leads to a calcium carbonate yield superior to 95% and that is improved over the yield of the prior art.

All the tested products exhibit a very good selectivity versus silicate.

The tested products are liquids which are very easy to handle. All the tested products are slightly corrosive.

| Example | Reagent 1 | Quantity [%] | Reagent 2 | Quantity [%] | Flotation time [min.] | Reagent dosage ppm | Flotation Product Weight [g] | HCl-insoluble residue [%] | Mass yield [%] | Calcite yield [%] | Flotation Foam Weight [g] | HCl-insoluble residue [%] | Mass yield [%] | Calcite yield (=loss of calcite) [%] |
|---|---|---|---|---|---|---|---|---|---|---|---|---|---|---|
| 16 | A | 50 | C | 50 | 20 | 700 | 1350.0 | 0.61 | 90.00 | 96.60 | 150.00 | 65.80 | 10.00 | 3.40 |
| 17 | D | 100 | — | — | 20 | 700 | 1308.0 | 1.80 | 87.20 | 92.90 | 192.00 | 44.83 | 12.80 | 7.06 |

The invention claimed is:

1. A process for purification of a calcium carbonate-comprising mineral composition comprising subjecting the calcium carbonate-comprising mineral composition to at least one flotation step with a collector agent comprising a quaternary imidazolium methosulfate, wherein the quaternary imidazolium methosulfate is 1-methyl-2-noroleyl-3-oleic acid-amidoethylimidazolium-methylsulfate.

2. The process according to claim 1, wherein the collector agent further comprises at least one primary, secondary, tertiary, quaternary amine and/or at least one of their salts.

3. The process according to claim 2, wherein the primary, secondary, tertiary, quaternary amine and/or their salts are selected such that:
   a) at least one of the amines and/or one of their salts features:
      three nitrogen substituents that are a hydrogen atom or a linear or branched hydrocarbon chain featuring 1 to 22 carbon atoms,
      no more than two of the three nitrogen substituents are a hydrogen,
      and in the case where the amine is a quaternary amine, the fourth nitrogen substituent is a methyl or benzyl group; and/or
   b) at least one of the amine is a bis-imidazoline and/or its salts having 8 to 22 carbon atoms in an alkyl radical which is a saturated or unsaturated aliphatic.

4. The process according to claim 1, wherein the collector agent further comprises 1-(2-hydroxyethyl)-2-(tall oil alkyl)-2-imidazoline.

5. The process according to claim 2, wherein the quaternary amine and/or its salts are selected from:
   a dimethyl dialkyl and/or methyl trialkyl and/or their salts, having from 8 to 22 carbon atoms in an alkyl radical, wherein the alkyl radical is a saturated or unsaturated, linear or branched aliphatic group,
   a dimethyl alkyl benzyl and/or methyl dialkyl benzyl and/or their salts, having 8 to 22 carbon atoms in an radical alkyl which is a linear or branched aliphatic group.

6. The process according to claim 5, wherein the quaternary amine is neutralized with a sulphate and/or chloride.

7. The process according to claim 2, wherein the salts of primary, secondary and tertiary amine are partially or fully neutralised with an acetate.

8. The process according to claim 1, wherein the collector agent further comprises bis-imidazoline and/or its salt, at a weight ratio of (quaternary imidazolium methosulfate):(bis-imidazoline and/or its salt) of between 10:90 and 99:1.

9. The process according to claim 1, wherein the collector agent further comprises bis-imidazoline and/or its salt, at a weight ratio of (quaternary imidazolium methosulfate):(bis-imidazoline and/or its salt) of between 25:75 and 75:25.

10. The process according to claim 1, wherein the collector agent further comprises bis-imidazoline and/or its salt, and an alkyldiamine salt.

11. The process according to claim 10, wherein the alkyldiamine salt is an alkyldiamine acetate salt, wherein the two amine groups are neutralized with acetic acid, and wherein the alkyl group has 8 to 22 carbon atoms that are entirely or partially hydrated.

12. The process according to claim 10, wherein the alkyldiamine salt is N-Tallow-alkyltrimethylenediamineacetate.

13. The process according to claim 10, wherein bis-imidazoline and/or its salt, and alkyldiamine salt are present at a weight ration of (bis-imidazoline):(alkyldiamine salt) of between 90:10 and 95:5.

14. The process according to claim 1, wherein the collector agent further comprises a quaternary amine and/or its salts selected from a dimethyl dialkyl amine and/or a methyl trialkyl amine and/or a dimethyl alkyl benzyl amine and/or a methyl dialkyl benzyl amine and/or their salts, at a weight ratio of (quaternary imidazolium methosulfate):(dimethyl dialkyl amine and/or methyl trialkyl amine and/or dimethyl alkyl benzyl amine and/or methyl dialkyl benzyl amine and/or their salts) of between 15:85 and 20:80.

15. The process according to claim 1, wherein the collector agent further comprises a salt of dimethyl dialkyl amine and/or of a methyl trialkyl amine and/or of a dimethyl alkyl benzyl amine and/or of a methyl dialkyl benzyl amine.

16. The process according to claim 15, wherein the salt is a sulfate and/or a chloride.

17. The process according to claim 16, wherein the salt is a chloride selected from dicocoalkyl-dimethyl ammonium chloride and/or trimethyltallow alkyl quaternary ammonium chloride and/or cocoalkyl-trimethyl ammonium chloride.

18. The process according to claim 14, wherein the collector agent further comprises 2-propanol and water.

19. The process according to claim 18, wherein the weight ratio of (dimethyl dialkyl amine and/or methyl trialkyl amine and/or dimethyl alkyl benzyl amine and/or methyl dialkyl benzyl amine and/or their salts): 2-propanol:water is approximately equal to 75:15:10.

20. The process according to claim 1, wherein the collector agent further comprises at least one graphite collector.

21. The process according to claim 20, wherein the graphite collector is a carbinol.

22. The process according to claim 21, wherein the carbinol is a secondary pentyl alcohol, and/or pine oil and/or an ethoxylated amine having 20 to 40 groups of ethylene oxide.

23. The process according to claim 1, wherein the flotation step is a direct or an inverse flotation.

24. The process according to claim 1, wherein the flotation step implements an agitation cell and/or a flotation column and/or a pneumatic flotation device and/or a flotation device featuring a gas injection or an air injection.

25. The process according to claim 1, wherein the flotation step comprises from 100 to 1000 ppm of the collector agent relative to dry solids in feed.

26. The process according to claim 1, wherein the flotation step is performed at a temperature between 4° C. and 80° C.

27. The process according to claim 1, wherein the flotation step is performed on an aqueous suspension of a calcium carbonate-comprising mineral composition having a solids content of between 5% and 80% of the total suspension weight.

28. The process according to claim 1, wherein the calcium carbonate-comprising mineral composition is a natural and/or synthetic calcium carbonate.

29. The process according to claim 1, wherein the calcium carbonate-comprising mineral composition comprises marble, chalk, calcite or mixtures thereof.

30. The process according to claim 1, wherein the calcium carbonate-comprising mineral composition comprises calcium carbonate and at least one other mineral material selected from dolomite, bentonite, kaolin, talc, cement, gypsum, lime, magnesia, titanium dioxide, satin white, aluminium trioxide, aluminium trihydroxide, silica, mica, a talc-calcium carbonate mixture, a calcium carbonate-kaolin mixture, a calcium carbonate mixture with aluminium trihydroxide or aluminium trioxide, or a mixture with synthetic or natural fibres, co-structures of minerals, co-structures of talc-calcium carbonate or of talc-titanium dioxide, or mixtures thereof.

31. The process according to claim 1, wherein the flotation step allows the flotation of one or more impurities selected from a silicate, quartz, feldspar, mica, an amphibole, a tremolite, a chlorite, talc, a sulphide, a pyrite, a pyrrhotite, a markasite, an oxide, a magnetite, a hematite, a goethite or mixtures thereof.

32. The process according to claim 1, wherein the flotation step leads to a recovery of at least 90% by weight of calcium carbonate present in the calcium carbonate-comprising mineral composition before the flotation step.

33. The process according to claim 1, wherein the flotation step is followed and/or preceded by at least one step of dispersing and/or grinding, optionally in the presence of at least one dispersing agent and/or grinding aid agent.

34. The process according to claim 1, wherein the flotation step is followed by at least one classification step and/or at least one treatment step and/or at least one drying step.

35. The process according to claim 1, wherein the flotation step is performed during a time period of at least 10 minutes.

36. The process according to claim 1, wherein the flotation step is performed at a pH of from 6.5 to 10.5.

37. The process according to claim 1, wherein the flotation step is performed batchwise and/or in a continuous process.

* * * * *